US005461747A

United States Patent [19]
Clausen et al.

[11] Patent Number: 5,461,747
[45] Date of Patent: Oct. 31, 1995

[54] DATA CARD CLEANER

[75] Inventors: Eivind Clausen, Bellingham, Wash.;
Ketil Fridheim, Oslo, Norway

[73] Assignee: Allsop, Inc., Bellingham, Wash.

[21] Appl. No.: 246,038

[22] Filed: May 19, 1994

[51] Int. Cl.[6] .................................................. A47L 25/00
[52] U.S. Cl. ........................ 15/104.94; 15/160; 15/210.1;
15/244.1; 401/10
[58] Field of Search ........................... 15/104.92–104.94,
15/160, 184, 210.1, 214, 218, 218.1, 220.4,
220.3, 244.1; 401/9–11

[56]          References Cited
          U.S. PATENT DOCUMENTS

| | | | |
|---|---|---|---|
| 1,978,716 | 10/1934 | Morehouse | 15/218 |
| 2,715,291 | 8/1955 | Sweigert | 15/220.4 |
| 2,719,313 | 10/1955 | Smith | 15/220.4 |
| 3,428,988 | 2/1969 | Blackburn | 15/160 |
| 3,800,349 | 4/1974 | Green | 15/4 |
| 3,813,722 | 6/1974 | Sapochinik | 15/104.92 |
| 4,031,853 | 6/1977 | Conrad | 15/104.93 |
| 4,104,758 | 8/1978 | Stotler | 15/104.92 |
| 4,864,114 | 9/1989 | Briane et al. | |
| 4,953,999 | 9/1990 | Rivers | 401/10 |
| 5,056,180 | 10/1991 | Stanton | 15/104.94 |

*Primary Examiner*—Mark Spisich
*Attorney, Agent, or Firm*—Christensen, O'Connor, Johnson & Kindness

[57]          ABSTRACT

A hand-held device for cleaning data-bearing cards includes a housing, a fluid applicator pad, a scrubber pad, a drying pad, and a removable panel. The housing includes a first surface to oppose the portion of the card to be cleaned. A first recess is disposed within the first surface. The first recess has an aperture extending through the housing. A second recess is also disposed adjacent the first recess within the first surface. A third recess is disposed adjacent the second recess within the first surface of the housing. The first, second, and third recesses are generally linearly aligned. The fluid applicator pad is disposed within the first recess. The scrubber pad is disposed within the second recess. The drying pad is disposed within the third recess. Each of the pads is thicker than the depth of its corresponding recess such that the pads project partially above the first surface of the housing. The panel is removably coupled to the housing. The panel includes a head portion having a second surface oriented generally parallel to the first surface of the housing. The second surface is directly opposed to the first surface for movement of the card therebetween for cleaning.

20 Claims, 2 Drawing Sheets

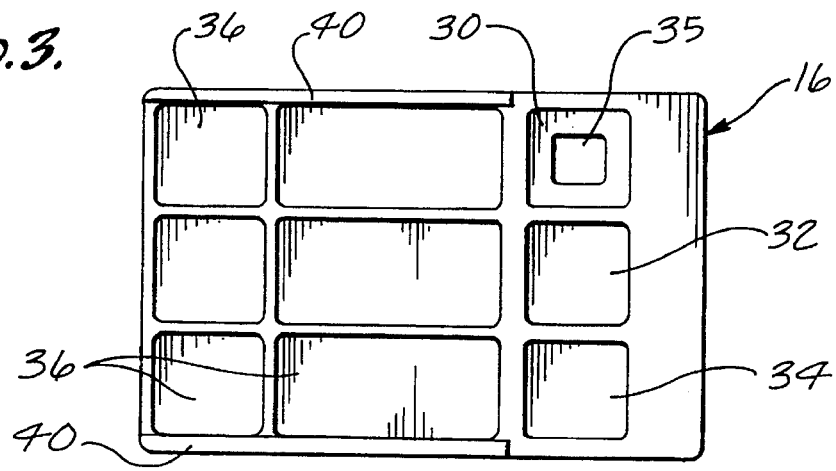
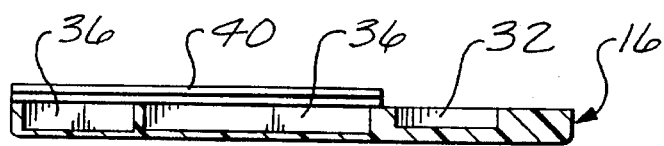
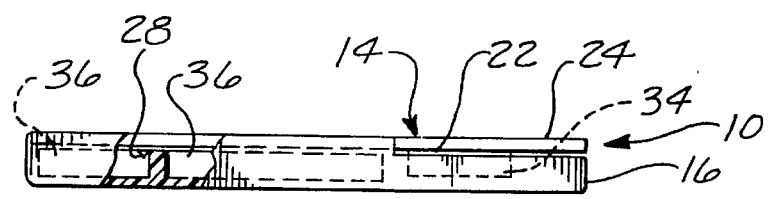
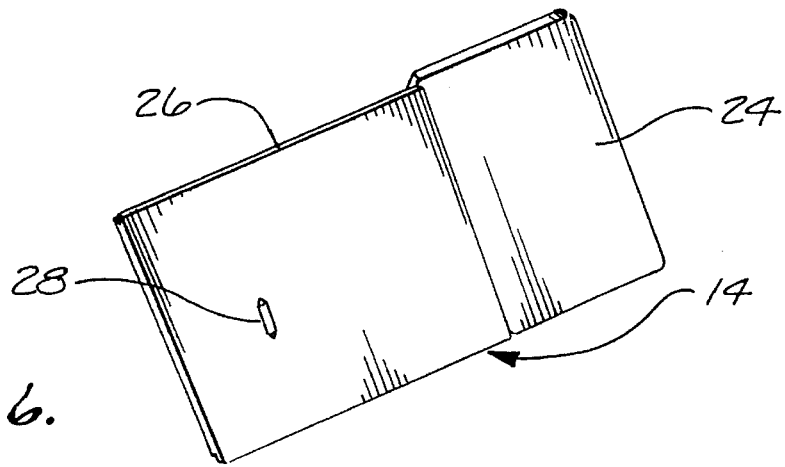

DATA CARD CLEANER

FIELD OF THE INVENTION

The present invention relates generally to cleaning systems and, more particularly, to a portable device for cleaning data-bearing strips of data cards.

BACKGROUND OF THE INVENTION

As more and more data-bearing cards, such as credit cards, optical memory cards, and key cards, are used and relied upon for security access, financial transactions, and records the need to keep the cards in readable condition grows. Increases in electronic processing of credit or debit cards at the point of purchase further intensify this need. The magnetic or optical strips of these cards may become soiled or otherwise collect foreign matter. If even a small portion of the data strip is obscured the card may not be read.

Numerous devices have been developed to clean cards. U.S. Pat. No. 4,104,758 to Stotler is one example of a credit card cleaner. The "washing device" employs a closed housing with a fluid reservoir and bristles to clean a card by passing the card between the bristles within the reservoir. The device is designed to be portable. However, to avoid spillage of the fluid a multipiece seal construction and a separate card-holding element are used. Such construction complexity only increases the cost of manufacture and chances for failure. The bulky size of the cleaner also makes it less convenient.

A similar device is disclosed in U.S. Pat. No. 3,428,988 to Blackburn. A fluid reservoir with opposing bristles is used to clean a credit card by inserting one end and then the other down through the bristles into the fluid. This device is not portable, as the fluid would pour from the top if the container were tilted. The device is, therefore, mounted to a post or other solid fixture.

Because of the above-described and other drawbacks of the present devices for cleaning data-bearing cards, as well as the increasing reliance on such cards, the present invention was developed. Use of the data card cleaner of the present invention is easy and convenient. The data card cleaner is small and spillproof. The use of the cleaner is natural in that the cards are typically run through readers in the same fashion. In one stroke of the card through the cleaner the data-bearing strip is wetted, wiped clean, and dried. Replacing or cleaning of the cleaning elements within the data card cleaner of the present invention is also easy.

SUMMARY OF THE INVENTION

A device for cleaning data-bearing cards is provided. The device includes a housing, a cleaning fluid applicator, and a scrubber. The housing includes a guide channel adapted to receive an edge of the card to be cleaned. The guide channel has a first side to oppose a data-bearing portion of the card and a second side opposite the first. The cleaning fluid applicator is disposed within the first side of the channel. The applicator applies a cleaning solution to the portion of the card that is to be cleaned. The scrubber is disposed within the first side of the guide adjacent the fluid applicator. The scrubber removes foreign matter from the card once the card has been wetted with the fluid applicator. A drying member is preferably also disposed within the first side of the guide channel. It is disposed adjacent the scrubber for drying the cleaned portion of the card. In the preferred form of the invention, the fluid applicator, the scrubber, and the drying member are each made of separate pads of open-cell foam material.

Also in the preferred form of the invention, the first side of the guide channel includes an aperture adjacent the fluid applicator. A cleaning solution may thus be applied to the fluid applicator pad through the aperture.

The housing may also include pad storage recesses accessible when the second side of the guide channel is removed from the first side of the channel.

The data card cleaner of the present invention may alternatively be defined as including a housing, a fluid applicator, a scrubber, and a panel. The housing has a first surface to oppose the portion of the card to be cleaned. The fluid applicator is coupled to the housing and disposed adjacent the first surface for applying a fluid to the portion of the card that is to be cleaned. The scrubber is coupled to the housing and disposed adjacent the first surface and adjacent the fluid applicator for wiping at least a portion of the card after fluid has been applied to it. The panel is removably coupled to the housing. The panel includes a head portion having a second surface oriented generally parallel to the first surface of the housing. The second surface directly opposes the first surface for placement of the card therebetween.

Preferably, the housing includes at least one recess within the first surface for receiving the fluid applicator and the scrubber. The recess has a depth less than the thickness of the fluid applicator and the scrubber, such that portions of the applicator and scrubber project above the first surface.

In the preferred form of the invention the fluid applicator and the scrubber comprise separate pads. One pad fits partially within an applicator recess and the other pad fits partially within a scrubber recess. The applicator recess includes an aperture through which fluid may be applied to the fluid applicator pad. Preferably, as mentioned above, a drying pad is also coupled to the housing and disposed adjacent the first surface and adjacent the scrubber. The housing includes a drying pad recess adjacent the scrubber recess for receiving the drying pad. At least one pad storage recess is also disposed within the housing beneath the panel. The panel is slidably secured to the housing to allow access to all pads beneath it.

In an alternate form of the invention, the fluid applicator and the scrubber comprise at least one pad of open-cell foam.

The invention provides a hand-held data card cleaner that may be used to clean data-bearing cards by simply holding one edge of the card while sliding the other edge, including the data strip, through the guide channel. When the card is slid through the guide channel, the data-bearing portion of the card first passes across the fluid applicator where it is wetted with a cleaning solution. The card then passes over the scrubber, which wipes the foreign material from the card, after which the card passes over the drying pad to dry the card and remove any residual foreign matter. The second surface of the guide channel ensures that the data-bearing portion of the card is forced against the wetting, scrubbing, and drying pads.

The data card cleaner is thus compact and easy to use. The aperture within the applicator recess allows a solution to be applied to the applicator pad from beneath the housing and the removability of the upper panel allows access to replacement pads and to the cleaning pads for removal and replacement purposes. The data card cleaner may be conveniently kept wherever credit cards or other databearing cards are frequently used. Notable locations include taxi cabs, automatic teller machines, and stores. Convenience and compatibility are also ensured, since the data card cleaner does not require electricity or other special hookups.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a top view of the lower housing of the data card cleaner with all pads removed;

FIG. 4 is a cross-sectional elevational view of the lower housing with the pads removed;

FIG. 5 is an elevational view of the data card cleaner with a partial cross section; and FIG. 6 is a perspective view of the upper panel of the data card cleaner showing the underside thereof.

DETAILED DESCRIPTION OF THE PREFERRED EMBODIMENTS

Figure 1:
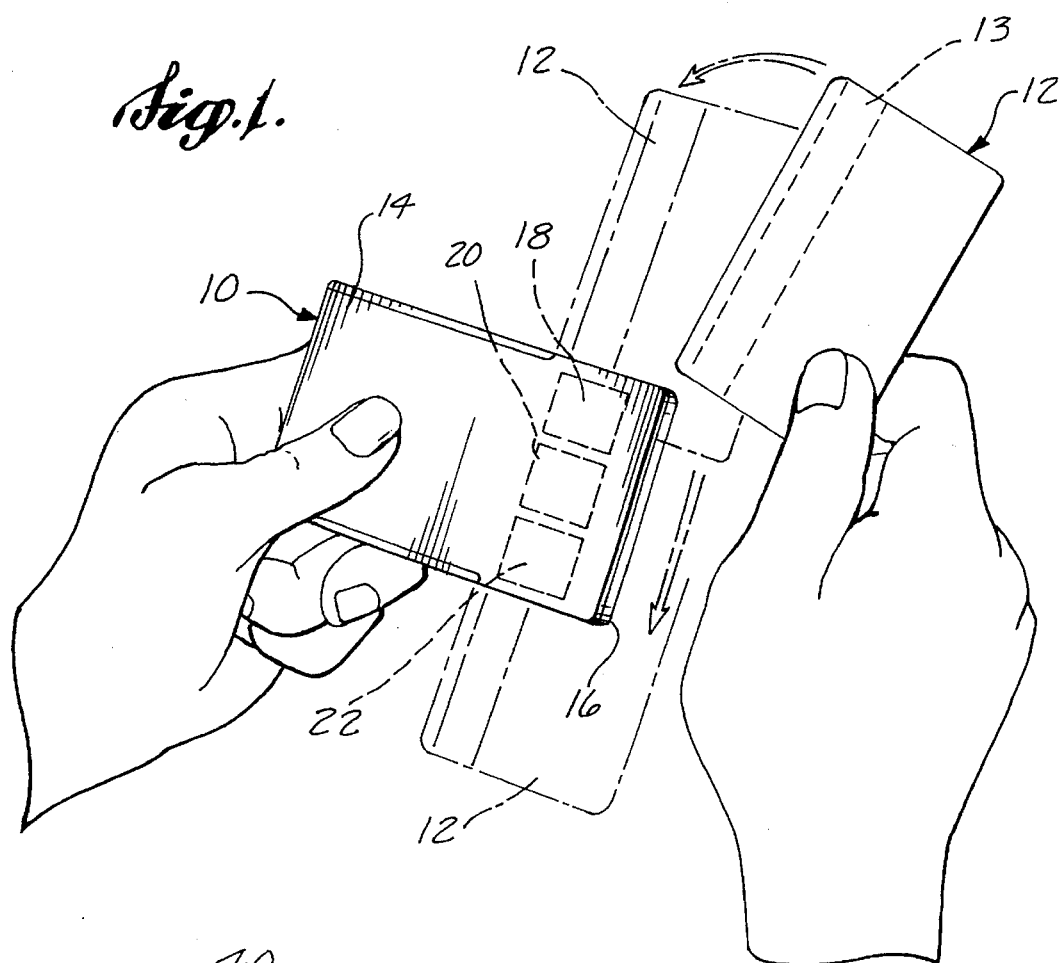
FIG. 1 is a perspective view of the data card cleaner of the present invention showing its use to clean a credit card.
Figure 2:
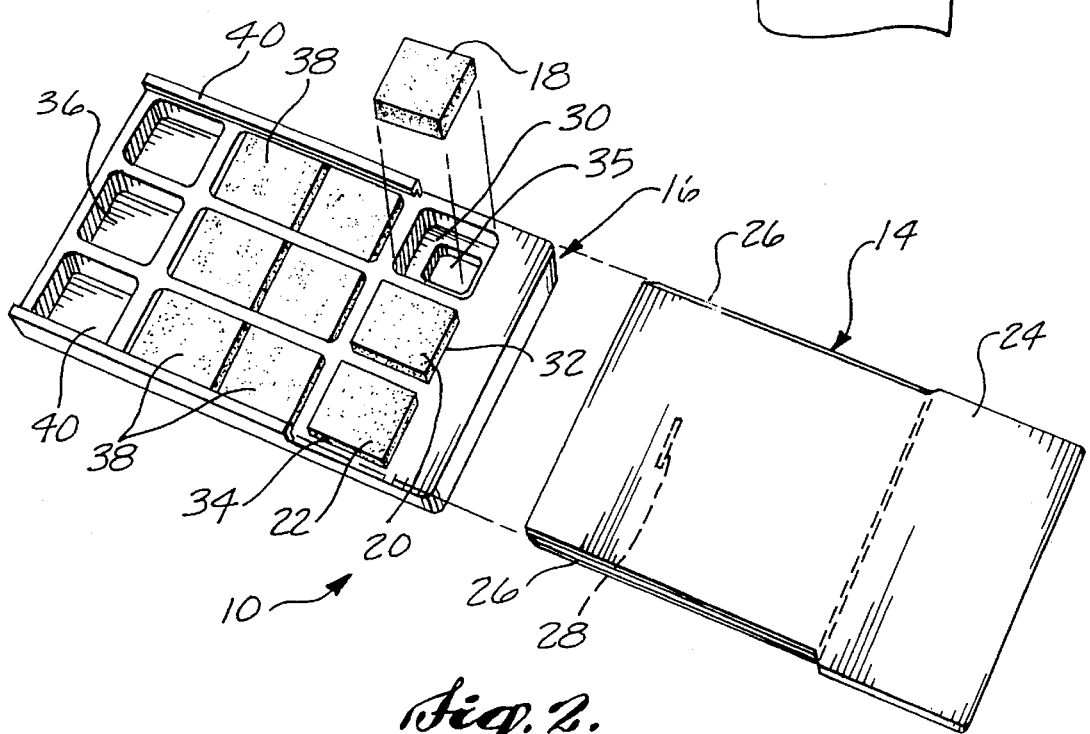
FIG. 2 is a perspective view of the data card cleaner with the upper panel and the wetting pad both exploded away.

Referring to FIG. 1, the basic structure and use of a card cleaner 10 to wet, scrub, and wipe a data card 12 with a data strip 13 will be described. The preferred embodiment of card cleaner 10 is used for cleaning credit card-type data cards that have a magnetic strip 13 extending along one side of the card offset from the center of the card. These data strips must be read, without interference, by credit card machines, teller machines, and other data-reading instruments. The cards are carried within purses, wallets, pockets, and bags where foreign matter, such as dirt, grease, lint, oils, or other materials, may collect on the data strip 13. If even one small portion of information cannot be read due to foreign matter on data strip 13, then the card cannot be used.

Similar problems occur with other data-bearing cards, such as optical memory cards. While the present invention is described with relation to a standard credit card-type data card, it should be understood that other data-bearing cards can also be cleaned by using the basic structure of the present invention, or with minor modifications from the preferred embodiment shown and described here, within the scope of the present invention.

Card cleaner 10 includes an upper panel 14, a lower housing 16, a wetting pad 18, a scrubbing pad 20, and a drying pad 22. Lower housing 16 provides the main body of card cleaner 10. Lower housing 16 is generally parallelepiped in shape, having a rectangular body slightly larger than that of a typical credit card. Upper panel 14 matches the flat rectangular shape of lower housing 16 but is cross-sectionally thinner. Upper panel 14 is held relative to lower housing 16 such that a guide channel is formed between the forward ends of the two. Pads 18, 20, and 22 are held within this guide channel and data card 12 is run through the guide channel to clean data strip 13.

Cleaning is preferably carried out by first applying a hydrocarbon solution to wetting pad 18, grasping data card 12 near the edge of the card opposite data strip 13, and sliding data card 12 in a direction along its longitudinal axis through the guide channel between lower housing 16 and upper panel 14, such that data strip 13 passes over wetting pad 18, scrub pad 20, and drying pad 22. As data strip 13 passes over wetting pad 18 the cleaning solution is applied to the strip. Data strip 13 then passes over and presses against scrubbing pad 20, which scrubs foreign matter from data strip 13. The user continues to slide data card 12 over drying pad 22 where any residual foreign matter is removed and data strip 13 is dried.

FIGS. 2–6 illustrate further details of card cleaner 10. Upper panel 14 includes a panel head 24 that is slightly wider and thinner than the rest of upper panel 14 to provide the proper gap between lower housing 16, pads 18, 20, and 22, and the inwardly facing surface of panel head 24. Panel shoulders 26 are provided on the lateral edges of upper panel 14 rearward of panel head 24. These panel shoulders 26 are slidably engaged by lower housing 16 for access to the pads, as described below. A detent 28 is also provided on the inward surface of upper panel 14 to hold upper panel 14 in a preferred location over lower housing 16.

Lower housing 16 includes three cleaning pad recesses: a wetting pad recess 30, a scrubbing pad recess 32, and a drying pad recess 34. These recesses are preferably approximately square and are separated from one another by a thin-walled section of lower housing 16. The width of the recesses is slightly greater than that of data strip 13. The depth of the recesses is slightly less than that of pads 18, 20, and 22.

A fluid application aperture is provided within the bottom of wetting pad recess 30, such that a cleaning solution can be applied to wetting pad 18 from the underside of lower housing 16. Fluid application aperture 35 is smaller than wetting pad recess 30, such that wetting pad 18 is securely held within wetting pad recess 30, while access is still adequate to apply a solution to wetting pad 18.

Pad recesses 30, 32, and 34 are linearly aligned generally perpendicular to the longitudinal access of lower housing 16. This arrangement allows card cleaner 10 to be held securely with one hand while data card 12 is passed through the opposite or forward end between panel 14 and lower housing 16 with the other hand, as illustrated in FIG. 1.

The rearward end of housing 16 includes storage recesses 36 within which replacement pads 38 may be held beneath upper panel 14. In the preferred form of the invention, nine replacement pads are held within storage recesses 36. Three rearward storage recesses 36 are preferably similar in size to wetting, scrubbing, and drying pad recesses 30, 32 and 34. Thus, similarly sized pads may be held for later use in these recesses. Recesses having a longer length but the same width are also preferably provided and adequately store replacement pads 38.

The lateral edges of lower housing 16 include ridges 40 adjacent storage recesses 36. Ridges 40 project above the remainder of lower housing 16 such that they can interface and provide sliding engagement with upper panel 14. Ridges 40 provide C-shaped channels within which panel shoulders 26 engage, such that the rearward end of panel 14 may be slid within ridges 40 above pads 18, 20, 22, and 38. Upper panel 14, when slid entirely in place, holds all pads in place within lower housing 16. The width of panel head 24 prevents upper panel 14 from being extended too far within ridges 40. Detent 28 is provided on the lower rearward surface of upper panel 14 such that it rests over a wall between storage recesses 36. Detent 28 holds upper panel 14 from accidental forward sliding relative to lower housing 16. Other detent means could alternatively be used.

Upper panel 14 is alternatively provided with downwardly extending ridges that form C-shaped channels. In this embodiment, lower housing 16 is provided with slots along its sides to receive the ridges of upper panel 14. The ridges of upper panel 14 could, alternatively, hook beneath lower housing 16 for sliding engagement therewith. Other arrangements are also possible, such as a hinged connection between upper panel 14 and lower housing 16.

FIGS. 3 and 4 provide further clarity as to the details of lower housing 16. Note in FIG. 4, specifically, that scrubbing pad recess 32 is not as deep as storage recesses 36. This arrangement allows the position of scrubbing pad 20 to extend above the upper surface of lower housing 16 such that it projects within the gap created between panel head 24 and lower housing 16. Wetting pad recess 30 and drying pad recess 34 are preferably similar in depth to scrubbing pad recess 32. Note in FIG. 5 that drying pad 22 actually projects out of drying pad recess 34 a sufficient distance to contact the lower surface of panel head 24. Thus, as data card 12 is passed between panel head 24 and lower housing 16, pads 18, 20, and 22 frictionally engage data strip 13 to scrub it clean. Pads 18, 20, and 22 are preferably constructed of open-cell foam such that they are compressible and do not completely obstruct the movement of data card 12. The soft nature of pads 18, 20, and 22 also avoids scratching the surface of strip 13.

Note in FIGS. 5 and 6 that the thickness of panel head 24 is less than that of the remainder of upper panel 14. This abrupt change in thickness provides a forwardly facing surface upon which the edge of data card 12 may ride when being moved through the channel created between panel head 24 and lower housing 16. As discussed above, this reduced thickness also ensures the proper gap to form the channel between panel head 24 and lower housing 16.

Alternative constructions of card cleaner 10, which fall within the scope of this invention, include using a single pad and a single recess for wetting, scrubbing, and drying. A wetting aperture may still be provided through lower housing 16 to apply a cleaning solution. Other scrubbing materials besides pads may also be used. Brushes, bristles, or cloth are examples of alternative wetting, scrubbing, or drying materials. A small fluid reservoir could also be provided in place of or attached to fluid application aperture 35. Also, as mentioned above, the specific dimensions could be altered for cleaning of optical memory cards or other data-bearing cards. Pads could also be provided within upper panel 14 for cleaning both sides of a card with one pass through the channel between panel 14 and lower housing 16.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device for cleaning data-bearing cards comprising:
   (a) a housing including an elongated guide channel adapted to receive an edge of the card to be cleaned, said guide channel having a first side to oppose a data-bearing portion of the card and a second side opposite the first side, said first and second sides each being spaced apart to define said guide channel, said guide channel being open at the ends and a top of the channel and further including a forwardly facing abutment surface at a bottom of the channel opposite the top on which an edge of the data bearing card engages and slides to properly position the card for cleaning when inserted into said guide channel;
   (b) a cleaning fluid applicator disposed within the first side of said guide channel for applying a cleaning solution to the portion of the card that is to be cleaned; and
   (c) a scrubber disposed within the first side of said guide channel laterally spaced adjacent said fluid applicator along the length of the guide channel for removing foreign matter from the card.

2. The device of claim 1, further comprising a drying member disposed within the first side of said guide channel adjacent said scrubber for drying the cleaned portion of the card.

3. The device of claim 1, wherein said fluid applicator and said scrubber comprise separate pads of material.

4. The device of claim 1, wherein said fluid applicator is a liquid permeable pad that includes a front side for contact with the card to be cleaned and a back side, and wherein the first side of said guide channel includes an aperture adjacent the back side of said fluid applicator through which a cleaning solution may be applied to the back side of said fluid applicator.

5. The device of claim 1, wherein the first side of said guide channel is removably secured to the second side of said guide channel.

6. The device of claim 5, wherein said fluid applicator and said scrubber comprise separate pads of material removably secured to the first side of said channel.

7. The device of claim 6, wherein said housing includes pad storage recesses that are not within said channel, said recesses being accessible when the second side of said guide channel is removed from the first side of said guide channel.

8. A device for cleaning data-bearing cards comprising:
   (a) a housing having a first surface to oppose the portion of the card to be cleaned;
   (b) a fluid applicator coupled to said housing and disposed adjacent said first surface for applying a fluid to the portion of the card that is to be cleaned;
   (c) a scrubber coupled to said housing and disposed adjacent said first surface and adjacent said fluid applicator for wiping at least a portion of the card; and
   (d) a panel removably coupled to said housing, said panel including a head portion and a body portion, said head portion having a second surface oriented generally parallel to said first surface of said housing, said second surface directly opposing said first surface for placement of the card therebetween the second surface of the panel is spaced from the first surface a distance greater than the body portion is from a portion of the housing directly opposite the body portion, the junction between said body portion and said head portion forming a forwardly facing slide surface on which the edge of the card to be cleaned rides to properly position the card for cleaning.

9. The device of claim 8, wherein said housing further includes at least one recess within said first surface for receiving said fluid applicator and said scrubber, said at least one recess including an aperture that extends through said housing adjacent said fluid applicator.

10. The device of claim 9, wherein said at least one recess has a depth less than the thickness of said fluid applicator and said scrubber such that portions of said fluid applicator and said scrubber project above said first surface.

11. The device of claim 10, wherein said fluid applicator and said scrubber comprise at least one pad of open-cell foam.

12. The device of claim 10, wherein said fluid applicator and said scrubber comprise separate pads, and wherein said housing includes an applicator recess and a scrubber recess for receiving said pads.

13. The device of claim 8, wherein said panel is slidably secured to said housing.

14. A hand-held device for cleaning data-bearing cards comprising:
   (a) a housing including a first surface to oppose the portion of the card to be cleaned, a first recess within said first surface, said first recess having an aperture extending through said housing, and a second recess adjacent said first recess within said first surface;
   (b) a fluid applicator pad disposed within said first recess, said fluid applicator pad being thicker than the depth of said first recess;
   (c) a scrubber pad disposed within said second recess, said scrubber pad being thicker than the depth of said second recess; and
   (d) a panel removably coupled to said housing, said panel including a head portion having a second surface oriented generally parallel to said first surface of said housing, said second surface directly opposing said first surface for movement of the card therebetween for cleaning.

15. The device of claim 14, further comprising a third recess adjacent said second recess within said first surface of said housing, said first, second, and third recesses being generally linearly aligned and a drying pad disposed within said third recess, said drying pad being thicker than the depth of said third recess.

16. A device for cleaning data-bearing cards comprising:
   (a) a housing having a first surface to oppose the portion of the card to be cleaned, said housing including a fluid applicator recess and a scrubber recess within said first surface;
   (b) a fluid applicator comprising a separate pad coupled to said housing and disposed within said fluid applicator recess adjacent said first surface for applying a fluid to the portion of the card that is to be cleaned, wherein said fluid applicator recess has a depth less than the thickness of said fluid applicator such that portions of said fluid applicator project above said first surface;
   (c) a scrubber comprising a separate pad coupled to said housing and disposed within said scrubber recess adjacent said first surface and adjacent said fluid applicator for wiping at least a portion of the card, wherein said scrubber recess has a depth less than the thickness of said scrubber such that portions of said scrubber project above said first surface; and
   (d) a panel removably coupled to said housing, said panel including a head portion having a second surface oriented generally parallel to said first surface of said housing, said second surface directly opposing said first surface for placement of the card therebetween.

17. The device of claim 16, wherein said applicator recess includes an aperture through which fluid may be applied to said fluid applicator.

18. The device of claim 17, further comprising a drying pad coupled to said housing and disposed adjacent said first surface and adjacent said scrubber, said housing including a drying pad recess adjacent said scrubber recess for receiving said drying pad.

19. The device of claim 18, further comprising at least one pad storage recess disposed within said housing beneath said panel.

20. The device of claim 17, wherein said panel is slidably secured to said housing.

\* \* \* \* \*

UNITED STATES PATENT AND TRADEMARK OFFICE
CERTIFICATE OF CORRECTION

PATENT NO. : 5,461,747
DATED : October 31, 1995
INVENTOR(S) : E. Clausen et al.

It is certified that error appears in the above-indentified patent and that said Letters Patent is hereby corrected as shown below:

| COLUMN | LINE | | |
|---|---|---|---|
| 5 (Claim 1, | 59 line 5) | "beating" should read --bearing-- | |
| 6 (Claim 1, | 47 line 5) | "therebetween the" should read --therebetween, the-- | |

Signed and Sealed this

Second Day of April, 1996

Attest:

BRUCE LEHMAN

Attesting Officer

Commissioner of Patents and Trademarks